US 8,141,083 B2

(12) United States Patent
Olszewski et al.

(10) Patent No.: US 8,141,083 B2
(45) Date of Patent: Mar. 20, 2012

(54) METHOD, APPARATUS, AND COMPUTER PROGRAM PRODUCT FOR PROVIDING A SELF-TUNABLE PARAMETER USED FOR DYNAMICALLY YIELDING AN IDLE PROCESSOR (75) Inventors: Bret Ronald Olszewski, Austin, TX (US); Randal Craig Swanberg, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 1022 days.

(21) Appl. No.: 12/061,353

(22) Filed: Apr. 2, 2008

(65) Prior Publication Data

US 2008/0184257 A1 Jul. 31, 2008

Related U.S. Application Data (63) Continuation of application No. 10/932,702, filed on Sep. 2, 2004, now abandoned.

(51) Int. Cl.
*G06F 9/46* (2006.01)
(52) U.S. Cl. ............... 718/102; 718/100; 718/104
(58) Field of Classification Search .............. None
See application file for complete search history.

(56) References Cited

U.S. PATENT DOCUMENTS

| 5,463,775 A * | 10/1995 | DeWitt et al. ............. 702/186 |
| 7,043,649 B2 * | 5/2006 | Terrell, II .................. 713/322 |
| 7,765,543 B1 * | 7/2010 | Weissman et al. ............. 718/1 |
| 2002/0004912 A1 * | 1/2002 | Fung ......................... 713/300 |
| 2002/0007387 A1 * | 1/2002 | Ginsberg .................... 709/102 |
| 2002/0194509 A1 * | 12/2002 | Plante et al. ................ 713/300 |
| 2005/0108714 A1 * | 5/2005 | Geye et al. ................. 718/100 |
| 2005/0149929 A1 * | 7/2005 | Srinivasan et al. ........... 718/100 |

OTHER PUBLICATIONS

Ranganathan et al. ("Decoupling computation and data scheduling in distributed data intensive applications", IEEE, 2002, pp. 1-7).*

* cited by examiner

*Primary Examiner* — Meng-Ai An
*Assistant Examiner* — Caroline H Arcos
(74) *Attorney, Agent, or Firm* — Yee & Associates, P.C.

(57) ABSTRACT

A method, apparatus, and computer program product are disclosed for dynamically determining when to yield a processor that is assigned to perform particular work but that is currently idle. A particular processor is assigned to perform work. A determination is made regarding whether the processor is currently idle. If the processor is currently idle, a determination is made of a length of time the processor has been idle. If this determined length of time exceeds a self-tunable threshold, the processor is yielded to make the processor available to perform other work. The threshold can be dynamically tuned during runtime.

9 Claims, 5 Drawing Sheets

METHOD, APPARATUS, AND COMPUTER PROGRAM PRODUCT FOR PROVIDING A SELF-TUNABLE PARAMETER USED FOR DYNAMICALLY YIELDING AN IDLE PROCESSOR

This application is a continuation of application Ser. No. 10/932,702, filed Sep. 2, 2004, is now abandoned.

BACKGROUND OF THE INVENTION

1. Technical Field

The present invention is directed to data processing systems. More specifically, the present invention is directed to a method, apparatus, and computer program product for utilizing a self-tuning parameter to dynamically determine when to yield a processor that is assigned to perform particular work but that is currently idle.

2. Description of Related Art

A symmetric multiprocessing (SMP) data processing system has multiple processors that are symmetric such that each processor has the same processing speed and latency. An SMP system has one operating system that divides the work into tasks that are distributed evenly among the various processors by dispatching one software thread of work to each processor at a time. Thus, a processor in an SMP system executes only one thread at a time.

A simultaneous multi-threading (SMT) data processing system includes multiple processors that can each concurrently execute more than one thread at a time per processor. An SMT system has the ability to favor one thread over another when both threads are running on the same processor. If one SMT thread is idle, the performance of other SMT threads that are executing on the same core can be improved by having the idle SMT thread yield its portion of its processor's resources.

Known systems can include a shared processor where the shared processor is shared among the various processes that are being executed by the system. A shared processor may be part of a logically partitioned system and shared among the various partitions in the system. These systems typically include firmware, also called a hypervisor, that manages and enforces the partitioning and/or sharing of the processor. For example, a hypervisor may receive a request from the system to dispatch a virtual processor to a physical processor. The virtual processor includes a definition of the work to be done by a physical processor as well as various settings and state information that are required to be set within the physical processor in order for the physical processor to execute the work.

In known systems there exists a pool of one or more available physical processors. When in the pool, these processors are available and currently unassigned. The pool is managed by a process or firmware such as a hypervisor. Any time work is needed to be performed, a request will be received by the hypervisor to dispatch a particular virtual processor that defines the work. The hypervisor then selects a physical processor from the pool to use to perform this work to which the virtual processor will be dispatched. When the physical processor is selected, it is logically removed from the pool and temporarily assigned to perform the work defined by the virtual processor. This temporary assignment is done when a particular virtual processor is dispatched by the hypervisor to a particular physical processor.

When a virtual processor is dispatched to a physical processor, the physical processor is assigned to that virtual processor for a preset period of time. The physical processor is assigned for that period of time regardless of the amount of time that may be needed to complete the work defined by the virtual processor. Thus, when the physical processor finishes the work defined by the virtual processor before the preset period of time expires, the physical processor will not have any useful work to do but will remain assigned to that virtual processor. In this case, the physical processor will be idle until the time period ends, i.e. it is not performing any useful work until the time period ends. When the time period ends, the physical processor is released from this temporary assignment and is again logically included in the pool of available processors.

Another example of a processor waiting for work is when a process being executed by the processor is spinning, waiting to acquire a software lock. Software locks are known in the art. Locks are typically used to serialize access to some shared resource. Thus, prior to a thread accessing a shared resource, it is required that the thread acquire a particular software lock. After a thread acquires the lock, that thread holds the lock as long as it requires access to the shared resource. Other threads desiring to access the same resource must wait until the thread finishes its work and releases the lock. When the lock is released, it is available. Waiting or spinning threads may again contend for the lock. Thus, when a process is spinning, the processor that is executing the process is not able to perform other useful work.

It is known in the art to be able to yield an idle processor. When a processor is yielded, it becomes available to be assigned to do other work. When it is yielded, it becomes part of the pool of available processors.

Therefore, a need exists for a method, apparatus, and computer program product for providing a selftuning parameter that is used to dynamically determine when to yield a processor that is assigned to perform particular work but that is currently idle.

SUMMARY OF THE INVENTION

A method, apparatus, and computer program product are disclosed for dynamically determining when to yield a processor that is assigned to perform particular work but that is currently idle. A particular processor is assigned to perform work. A determination is made regarding whether the processor is currently idle. If the processor is currently idle, a length of time is determined that the processor has been idle. If this determined length of time exceeds a self-tunable threshold, the processor is yielded to make the processor available to perform other work.

The threshold can be dynamically tuned during runtime. Statistics are collected during runtime regarding the time spent by processors in the system idling. The threshold can be dynamically tuned during runtime using the statistics without user intervention. The threshold can be adjusted to a new value where the new value is determined using the statistics.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

A preferred embodiment of the present invention and its advantages are better understood by referring to the figures, like numerals being used for like and corresponding parts of the accompanying figures.

The present invention is a method, apparatus, and computer program product for providing a self-tunable parameter that is used to dynamically determine when to yield a processor that is assigned to perform particular work but that is currently idle.

System throughput and performance can be increased by proactively yielding processors when the processors are idle. Each time a physical processor becomes available due to, for example, one virtual processor yielding its physical processor to be available to another virtual processor, a context switch must occur to switch the settings and state of the physical processor from the first virtual processor to the new virtual processor. While yielding an idle processor frees up the processor in a shared processor LPAR system, or boosts the performance of sibling threads in an SMT system, the net result is an increased latency for starting new work which can noticeably impact some workloads. By providing a tunable parameter that is used to control how quickly a shared processor or SMT thread will give up their resource for the benefit of another processor or SMT thread, the present invention will boost the performance of the system while reducing the latency impact for starting new work.

The present invention provides a tunable threshold parameter. This tunable parameter is used to determine how long an idle virtual processor will wait for work before yielding its physical processor to make the physical processor available to be claimed by another virtual processor. This parameter can be set to "0", meaning that the physical processor will always be yielded when idle, be set to "infinity" meaning that the physical processor will never be yielded when idle, or be set to some value in between.

Typically when a virtual processor is dispatched to a physical processor, a particular physical processor is temporarily assigned and dedicated to that virtual processor for a particular period of time. This particular period of time is typically a set length of time that is defined within the system. When the period of time expires, regardless of whether the physical processor has finished executing the work defined by the virtual processor, the physical processor will rejoin the pool of available physical processors. In many cases, a physical processor will finish executing the work defined by a virtual processor before the period of time expires. In these cases, the physical processor is idle until the period of time expires.

The parameter can be modified as the system is processing work. This provides the ability to configure the system for maximum performance of the currently scheduled work by making all processing capacity available, for maximizing the performance of starting new work by avoiding latency, or for a reasonable balance to avoid latency for certain arrival rates of new work while donating processing power after some preset amount of delay.

Figure 1:
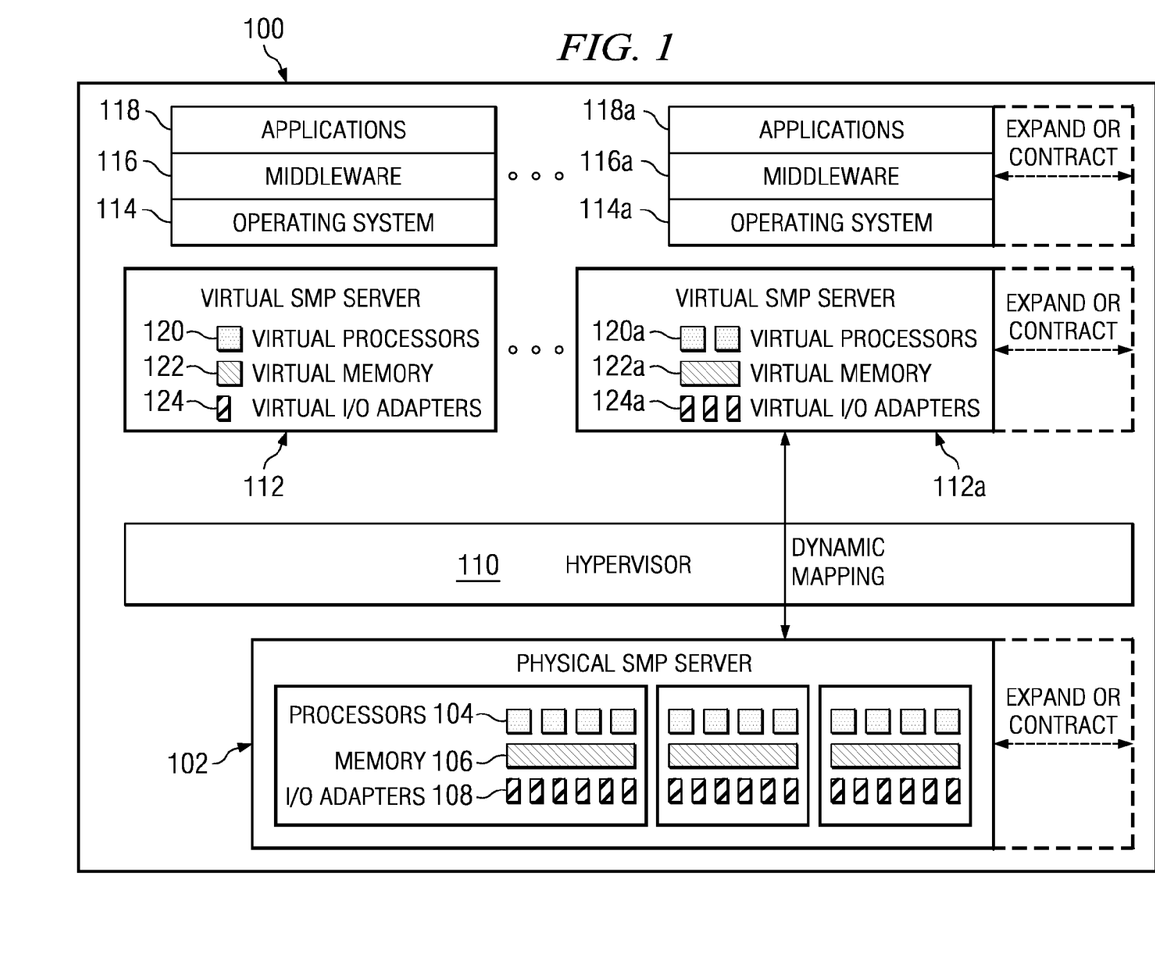
FIG. 1 is a block diagram of a data processing system, including a hypervisor, in which the present invention may be implemented.

FIG. 1 is a block diagram of a data processing system 100, including a hypervisor, in which the present invention may be implemented. System 100 is preferably a symmetric multiprocessing (SMP) server computer system. SMP server computer system 100 includes physical hardware devices that can be mapped to, i.e. temporarily owned by, a user application to execute that application.

SMP server computer system 100 includes a physical SMP server 102. Physical SMP server 102 includes physical hardware devices such as processors 104, memory 106, and I/O adapters 108. These physical devices are managed by hypervisor 110. Each one of the processors 104 is preferably a simultaneous multithreaded (SMT) processor that is capable of concurrently executing multiple different threads on the processor.

A virtual server is a proxy for a physical server that has the same capabilities, interfaces, and state. Virtual servers are created and managed by a hypervisor that resides on physical SMP server computer system 100. A virtual server appears to be a physical SMP server to its user: the operating system, middleware, and application software that run upon it. SMP server computer system 100 includes one or more virtual servers such as virtual server 112 and virtual server 112a.

Each virtual server appears to its software to include its own processor(s), memory, and I/O adapter(s) that are available for the exclusive use of that virtual server. For example, virtual server 112 includes a virtual processor 120, virtual memory 122, and virtual I/O adapters 124. Virtual server 112a includes virtual processors 120a, virtual memory 122a, and virtual I/O adapters 124a.

Each virtual server supports its own software environment, including an operating system, middleware, and applications. The software environment of each virtual server can be different from the software environment of other virtual servers. For example, the operating systems executed by each virtual server may differ from one another.

For example, virtual server 112 supports operating system 114, middleware 116, and applications 118. Virtual server 112a supports operating system 114a, middleware 116a, and applications 118a. Operating systems 114 and 114a may be the same or different operating systems.

A virtual server is a logical description of a server that defines a server environment that acts, to a user, as if it were a physical server, being accessed and providing information in the same way as a physical server. The virtual processors, virtual memory, and virtual I/O adapters that are defined for each virtual server are logical substitutes for physical processors, memory, and I/O adapters.

Hypervisor 110 manages the mapping between the virtual servers with their virtual processors, virtual memory, and virtual I/O adapters and the physical hardware devices that are selected to implement these virtual devices. For example, when a virtual processor is dispatched, a physical processor, such as one of physical processors 104, is selected by hypervisor 110 to be used to execute and implement that virtual processor. Hypervisor 110 manages the selections of physical devices and their temporary assignment to virtual devices.

Hypervisor 110 is responsible for dynamically creating, managing, and destroying virtual SMP servers. Whole virtual processors, virtual I/O adapters, and virtual memory blocks can be removed or added by hypervisor 110. Hypervisor 110 is also responsible for dynamic resource allocation, managing time-sharing of physical resources, and altering the physical resource mapped to a processor without involving the operating system. Hypervisor 110 is also able to dedicate physical resources to virtual resources for situations where sharing is not desired. Hypervisor 110 is responsible for managing the addition or removal of physical resources. Hypervisor 110 makes these additions and deletions transparent to the upper level applications.

Figure 2:
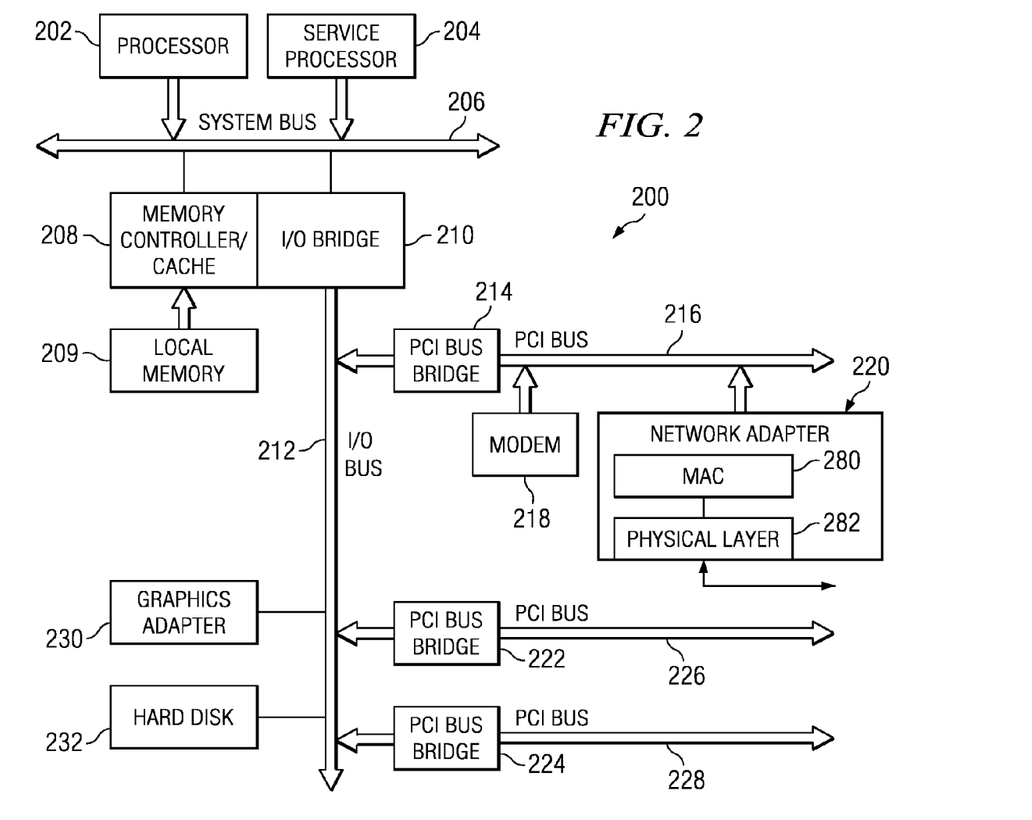
FIG. 2 is a more detailed illustration of a computer system that may be used to implement any of the computer systems described herein in which the present invention may be implemented in accordance with the present invention.

FIG. 2 is a more detailed illustration of a computer system that may be used to implement any of the computer systems described herein in which the present invention may be implemented in accordance with the present invention. Data processing system 200 may be a symmetric multiprocessor (SMP) system including a plurality of SMT-capable processors 202 and 204 connected to system bus 206. Alternatively, a single processor system may be employed. In the depicted example, processor 204 is a service processor. All of the processors described herein with reference to all of the figures are SMT-capable processors. Each SMT-capable processor is capable of concurrently executing multiple threads on the one processor.

Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108-112 in FIG. 1 may be provided through modem 218 and network adapter 220 connected to PCT local bus 216 through add-in boards.

Network adapter 220 includes a physical layer 282 which conditions analog signals to go out to the network, such as for example an Ethernet network over an R45 connector. A media access controller (MAC) 280 is included within network adapter 220. Media access controller (MAC) 280 is coupled to bus 216 and processes digital network signals. MAC 280 serves as an interface between bus 216 and physical layer 282. MAC 280 performs a number of functions involved in the transmission and reception of data packets. For example, during the transmission of data, MAC 280 assembles the data to be transmitted into a packet with address and error detection fields. Conversely, during the reception of a packet, MAC 280 disassembles the packet and performs address checking and error detection. In addition, MAC 280 typically performs encoding/decoding of digital signals transmitted and performs preamble generation/removal as well as bit transmission/reception.

Additional PCI bus bridges 222 and 224 provide interfaces for additional PC6 buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Service processor 204 interrogates system processors, memory components, and I/O bridges to generate an inventory and topology understanding of data processing system 200. Service processor 204 also executes Built-In-Self-Tests (BISTs), Basic Assurance Tests (BATs), and memory tests on all elements found by interrogating a system processor, memory controller, and I/O bridge. Any error information for failures detected during the BISTs, BATs, and memory tests are gathered and reported by service processor 204.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The present invention may be executed by one of the computers depicted by FIG. 1 or 2.

Figure 3:
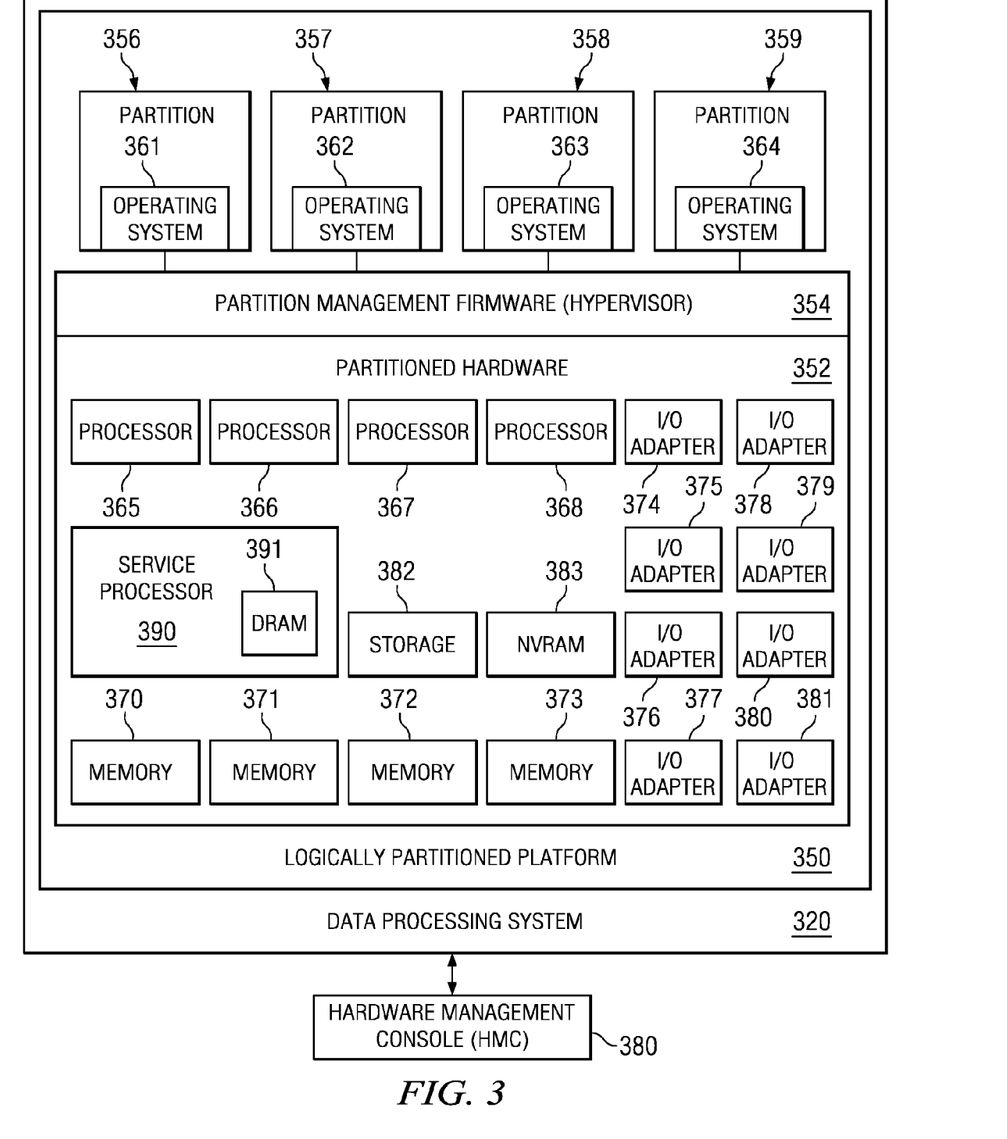
FIG. 3 is a block diagram of a logically partitioned platform that includes the present invention.

FIG. 3 is a block diagram of a logically partitioned platform that includes the present invention. Data processing system 320 includes logically partitioned platform 350. Platform 350 includes partitioned hardware 352, partition management firmware, also called a hypervisor 354, and partitions 356-359. Operating systems 361-364 exist within partitions 356-359. Operating systems 361-364 may be multiple copies of a single operating system or multiple heterogeneous operating systems simultaneously run on platform 350.

Partitioned hardware 352 includes a plurality of SMT-capable processors 365-368, a plurality of system memory units 370-373, a plurality of input/output (I/O) adapters 374-381, and a storage unit 382. Each of the processors 365-368, memory units 370-373, NVRAM storage 383, and I/O adapters 374-381 may be assigned to one of multiple partitions 356-359. Partitioned hardware 352 also includes service processor 390. A non-volatile memory device 391, such as an NVRAM device, is included within service processor 390.

Partition management firmware (hypervisor) 354 performs a number of functions and services for partitions 356-359 to create and enforce the partitioning of logically partitioned platform 350. Hypervisor 354 is a firmware implemented virtual machine identical to the underlying hardware. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and non-volatile random access memory (non-volatile RAM). Thus, hypervisor 354 allows the simultaneous execution of independent OS images 361-364 by virtualizing all the hardware resources of logically partitioned platform 250. Hypervisor 354 may attach I/O devices through I/O adapters 374-381 to single virtual machines in an exclusive mode for use by one of OS images 361-364.

A hardware management console (HMC) 380 may be coupled to service processor 390 in data processing system 320. HMC 380 is a separate computer system that is coupled to service processor 390 and may be used by a user to control various functions of system 320 through service processor 390.

Figure 4A:
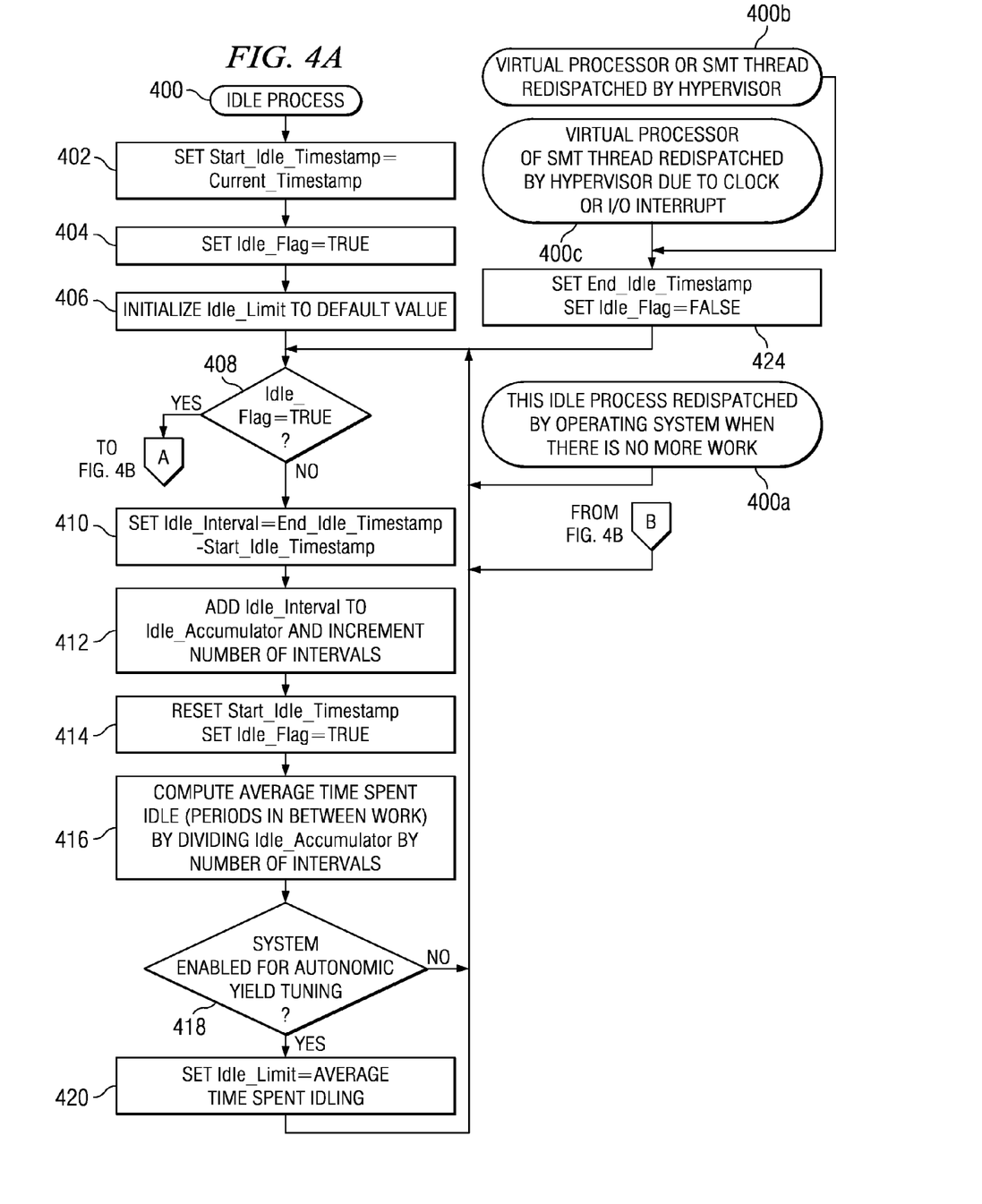
FIGS. 4A and 4B together depict a high level flow chart that illustrates in more detail using a self-tunable parameter to determine when to yield a processor that is assigned to perform particular work but that is currently idle in accordance with the present invention.
Figures 4B, 5:
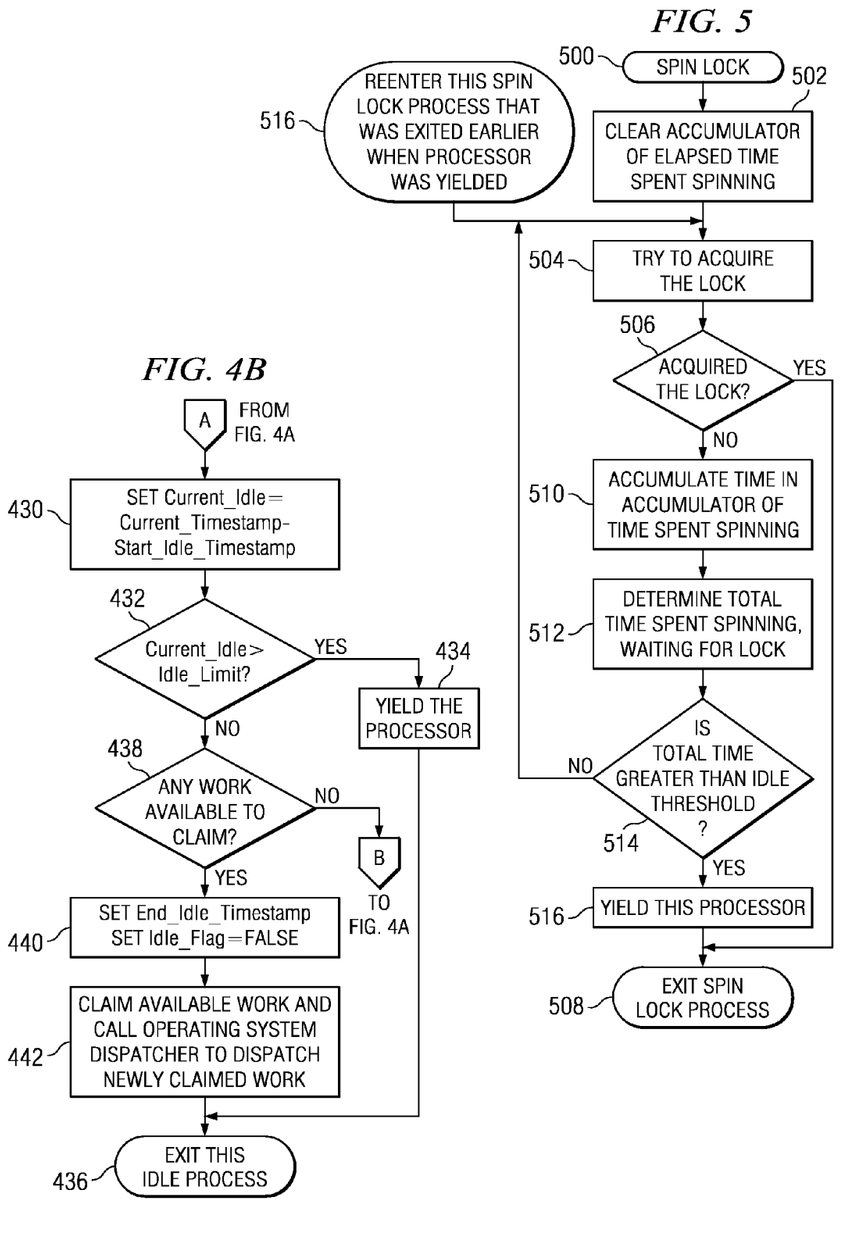
FIG. 5 illustrates a high level flow chart that depicts another example of utilizing a tunable parameter for determining when to yield a processor in accordance with the present invention.

FIGS. 4A and 4B together depict a high level flow chart that illustrates in more detail using a tunable parameter to determine when to yield a processor that is assigned to perform particular work but that is currently idle and that illustrates modifying the tunable parameter in accordance with the present invention. Block 400 depicts the start of a particular Idle process such as an idle thread. This idle thread is executed by a physical processor that has been allocated to a particular process, such as by having a virtual processor dispatched to the physical processor or by an SMT physical processor executing a thread. It is known in the art for a processor to select and execute an Idle thread when that processor is not currently performing any work. Thus, when a processor is waiting for work to do, the processor will execute the Idle thread. The process depicted by FIGS. 4A and 4B are executed by the idle thread. Next, block 402 illustrates setting a Start_Idle_Timestamp equal to a Current_Timestamp. The Current_Timestamp is the current value of the system's clock. Thus, the Current_Timestamp represents the current real time. The Start_Idle_Timestamp is used to indicate when a processor first started idling. This indicates the start of an interval.

The process then passes to block 404 which depicts setting the Idle_Flag equal to "TRUE". The Idle_Flag is used to indicate whether the processor is currently idling. If the processor is idling, the Idle_Flag will be set to "TRUE". When the processor is not idling, the Idle_Flag will be set to "FALSE".

Next, block 406 illustrates initializing the Idle_Limit parameter to be equal to a default value. The Idle_Limit parameter is a self-tunable threshold that is used to determine when to yield a processor that is idle. During runtime and without user intervention, the Idle_Limit parameter can be adjusted to a new value that is determined using the average time spent idling statistics.

Block 408, then, illustrates a determination of whether or not the Idle_Flag is equal to "TRUE". If a determination is made that the Idle_Flag is not equal to "TRUE", i.e., it is equal to "FALSE", the process passes to block 410 which depicts setting the Idle_Interval equal to the End_Idle_Timestamp minus the Start_Idle_Timestamp. The End_Idle_Timestamp is set when the processor is no longer idle. The Idle_Interval value is the amount of time this processor was idle during this entire interval. When the process passes to block 410, an interval has occurred. This interval is an interval between a start and an end sample. The start of a sample is marked by the Start_Idle_Timestamp, and the end of that sample is marked by the End_Idle_Timestamp. Next, block 412 illustrates adding the Idle_Interval value to the Idle_Accumulator value and incrementing the current number of intervals. The Idle_Accumulator value is the total amount of time that all processors have been idle during all intervals. Block 414, then, depicts resetting the Start_Idle_Timestamp to be equal to the Current_Timestamp in order to mark the beginning of the next sample. The Idle_Flag is set equal to "TRUE".

The process then passes to block 416 which illustrates computing the average time spent idling by all processors in the system by dividing the Idle_Accumulator value by the number of intervals. The number of intervals is another variable that is also maintained by the present invention. The number of intervals is incremented each time the End_Idle_Timestamp is set equal to the Current_Timestamp. Thereafter, block 418 depicts a determination of whether or not the system is enabled for autonomic yield tuning. This is a determination of whether or not the system is enabled to modify the Idle_Limit parameter itself during operation without any user input. If a determination is made that the system is not enabled for autonomic yield tuning, the process passes to block 408. If a determination is made that the system is enabled for autonomic yield tuning, the Idle threshold, represented by the Idle-Limit value, can dynamically adjust itself during runtime. If the system is enabled for autonomic yielding, the process passes to block 420 which depicts setting the Idle_Limit value equal to the average time spent idling determined as depicted by block 416. Therefore, the Idle_Limit threshold is dynamically adjusted using the average time spent idling statistics. The process then passes back to block 408.

There are several methods for reentering or resuming the same particular idle process in a particular processor that had been suspended. The same idle process is defined as being the idle process that is executed by a particular processor when that physical processor has no more work to do. This idle process may be interrupted and then later resumed. For example, an I/O interrupt to the processor currently running the idle process can cause the idle process to be interrupted while useful work occurs in the interrupt handler. Another example is when the idle process yields its processor, the idle process is interrupted. When new work becomes available for the idle virtual processor, the idle virtual processor can be "prodded" such that its idle process is resumed and will then see the new work available. The present invention tracks the amount of time the processor spent idling before new work became available for it. That new work could be defined as interrupt processing work, an existing sleeping job becoming runnable again, or a new job ready to run for the first time.

One method for resuming or reentering the same idle process that had been suspended is depicted by block 400a. Block 400a depicts this same idle process being redispatched by an operating system when there is no more work for this processor to perform. When the same idle process is redispatched by an operating system when there is no more work for this processor to perform, the process passes back to block 408.

Another method for resuming or reentering the same idle process that had been suspended in a particular processor is illustrated by block 400b. Block 400b depicts either a virtual processor being redispatched by the hypervisor to this processor, or an SMT thread being redispatched to this processor by the hypervisor. One of these events will occur when another processor revived this processor. When another processor revives this processor, it is because there is now useful work for this processor to perform. In either case, if the hypervisor redispatched a virtual processor or an SMT thread to this processor, the process passes to block 424 which illustrates setting the End_Idle_Timestamp equal to the Current_Timestamp. The Idle_Flag is then set to "FALSE". The process then passes to block 408.

Another method for resuming or reentering the same idle process that had been suspended in a particular processor is illustrated by block 400c. Block 400c depicts either a virtual processor being redispatched by the hypervisor to this processor, or an SMT thread being redispatched to this processor by the hypervisor due to a clock or I/O interrupt. The hypervisor will redispatch the virtual processor or SMT thread when there is work for the processor to do. Thus, by definition, when the hypervisor redispatches the virtual processor or SMT thread, the processor has been assigned work to do and is therefore no longer idle. If the hypervisor redispatched a virtual processor or an SMT thread to this processor due to a clock or I/O interrupt, the process passes to block 424 and thereafter to block 408.

Referring again to block 408, if a determination is made that the Idle_Flag is equal to "TRUE", the process passes to block 430 (see FIG. 4B). Block 430 depicts setting the Current_Idle value equal to the Current_Timestamp minus the Start_Idle_Timestamp. Next, block 432 illustrates a determination of whether or not the Current_Idle value is greater than the Idle_Limit. If a determination is made that the Current_Idle value is greater than the Idle_Limit, the process passes to block 434 which depicts yielding this processor. An SMT processor can be yielded, for example, by transitioning the processor into single threaded mode. A shared processor can be yielded, for example, by ceding the virtual processor to the hypervisor for redispatch.

The idle process is then exited as illustrated by block 436. Referring again to block 432, if a determination is made that the Current_Idle value is not greater than the Idle_Limit, the process passes to block 438 which depicts a determination of whether or not there is any available work for this processor to claim. If a determination is made that there is no available work for this processor to claim, the process passes back to block 408 (see FIG. 4A).

Referring again to block 438, if there is available work for this processor to claim, the process passes to block 440 which illustrates setting the End_Idle_Timestamp equal to the Current_Timestamp. The Idle_Flag is set equal to "FALSE". Next, block 442 depicts this processor claiming the available work by calling the operating system dispatcher to dispatch the newly claimed work. This idle process is then either exited or suspended as appropriate as illustrated by block 436.

FIG. 5 illustrates a high level flow chart that depicts another example of utilizing a tunable parameter for determining when to yield a processor in accordance with the present invention. The process starts as depicted by block 500 and thereafter passes to block 502 which illustrates clearing an accumulator of elapsed time spent spinning waiting to acquire a software lock. Next, block 504 depicts a process that is being executed by a processor trying to acquire the lock. Block 506, then, illustrates a determination of whether or not the process was able to acquire the software lock. If a determination is made that the process was able to acquire the software lock, the process passes to block 508 which depicts exiting this "spin lock" process.

Referring again to block 506, if a determination is made that the process was not able to acquire the software lock, the process passes to block 510 which illustrates accumulating in the accumulator the time spent spinning by this process waiting to acquire the lock. Next, block 512 depicts determining the total time spent so far by this process spinning waiting to acquire the lock. Block 514, then, illustrates a determination of whether or not the total time spent by the process spinning is greater than the Idle threshold. If a determination is made that the total time spent spinning is not greater than the Idle threshold, the process passes back to block 504.

Referring again to block 514, if a determination is made that the total time spent spinning is greater than the Idle threshold, the process passes to block 516 which illustrates yielding this processor. The process then passes to block 508 which depicts exiting this "spin lock" process.

As described above with reference to the Idle threshold that was utilized for yielding a processor, the Idle threshold used for determining if a spin lock process has spent too long spinning is also autonomic, or self-tunable. The spin lock process Idle threshold could tune itself, similarly to the yielding process Idle threshold, by setting a new spin lock process Idle threshold to a time spent spinning waiting for a lock.

It is important to note that while the present invention has been described in the context of a fully functioning data processing system. Those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a shared processor data processing system for dynamically determining when to yield a processor that is assigned to perform particular work but that is currently idle, said method comprising:
   assigning a particular one of a plurality of processors to perform work;
   in response to the particular one of the plurality of processors becoming idle:
      starting an execution of an idle thread by the particular one of the plurality of processors;
      setting, by the idle thread, a first timestamp; and
      determining, by the idle thread, a length of time the particular one of the plurality of processors has been idle;
   determining, by the idle thread, whether the particular one of the plurality of processors is no longer idle;
   in response to the idle thread determining that the particular one of the plurality of processors is no longer idle:
      setting, by the idle thread, a second timestamp;
      determining, by the idle thread, an idle interval by determining a difference between the first timestamp and the second timestamp, wherein the time between the particular one of the plurality of processors becoming idle and the particular one of the plurality of processors no longer being idle is the idle interval;
      incrementing, by the idle thread, a number of intervals, wherein the number of intervals is a total number of times that each one of the plurality of processors became idle and said each one of the plurality of processors was thereafter no longer idle;
      adding, by the idle thread, the idle interval to an idle accumulator, wherein the idle accumulator is a total amount of time that all of the plurality of processors have spent idling during all of the intervals;
      computing, by the idle thread, an average time spent idling by dividing the idle accumulator by the number of intervals; and
      setting, by the idle thread, an idle threshold equal to the average time spent idling;
   dynamically adjusting, by the idle thread, the idle threshold during runtime without user intervention by autonomically adjusting the idle threshold to a new value that is computed using an adjusted idle interval, an adjusted number of intervals, and an adjusted average time spent idling; and
   in response to the length of time exceeding the idle threshold, making the particular processor available to perform other work.

2. The method according to claim 1, further comprising:
   temporarily suspending said execution of said idle thread while said particular processor executes work;
   pausing said accumulation, by said idle thread, of said length of time said particular processor has been idle when said idle thread execution is suspended;

resuming said execution of said idle thread;
resuming said accumulation, by said idle thread, of said length of time said particular processor has been idle when said idle thread execution is resumed.

3. The method according to claim 1, further comprising:
exiting said idle thread;
determining a start of an interval when said particular processor first becomes idle; and
determining an end of said interval when said idle thread is exited.

4. An apparatus in a shared processor data processing system for dynamically determining when to yield a processor that is assigned to perform particular work but that is currently idle, said apparatus comprising:
a particular one of a plurality of processors that is assigned to perform work;
in response to the particular one of the plurality of processors becoming idle:
the particular one of the plurality of processors starting an execution of an idle thread:
the idle thread setting a first timestamp; and
the idle thread determining a length of time the particular one of the plurality of processors has been idle;
the idle thread determining whether the particular one of the plurality of processors is no longer idle;
in response to the idle thread determining that the particular one of the plurality of processors is no longer idle:
the idle thread setting a second timestamp;
the idle thread determining an idle interval by determining a difference between the first timestamp and the second timestamp, wherein the time between the particular one of the plurality of processors becoming idle and the particular one of the plurality of processors no longer being idle is the idle interval;
the idle thread incrementing a number of intervals, wherein the number of intervals is a total number of times that each one of the plurality of processors became idle and said each one of the plurality of processors was thereafter no longer idle;
the idle thread adding the idle interval to an idle accumulator, wherein the idle accumulator is a total amount of time that all of the plurality of processors have spent idling during all of the intervals;
the idle thread computing an average time spent idling by dividing the idle accumulator by the number of intervals; and
the idle thread setting an idle threshold equal to the average time spent idling;
the idle thread dynamically adjusting the idle threshold during runtime without user intervention by autonomically adjusting the idle threshold to a new value that is computed using an adjusted idle interval, an adjusted number of intervals, and an adjusted average time spent idling; and
in response to the length of time exceeding the idle threshold, the particular processor is available to perform other work.

5. The apparatus according to claim 4, further comprising:
said firmware temporarily suspending said execution of said idle thread while said particular processor executes work;
said idle thread pausing said accumulation of said length of time said particular processor has been idle when said idle thread execution is suspended;
said firmware resuming said execution of said idle thread;
said idle thread resuming said accumulation of said length of time said processor has been idle when said idle thread execution is resumed.

6. The apparatus according to claim 5, further comprising:
said particular processor exiting said idle thread;
said idle thread determining a start of an interval when said processor first becomes idle; and
said idle thread determining an end of said interval when said idle thread is exited.

7. A computer program product, which is stored in a non-transitory computer storage medium, in a shared processor data processing system for dynamically determining when to yield a processor that is assigned to perform particular work but that is currently idle, said product comprising:
instructions for assigning a particular one of a plurality of processors to perform work;
in response to the particular one of the plurality of processors becoming idle:
instructions for starting an execution of an idle thread by the particular one of the plurality of processors;
instructions for setting, by the idle thread, a first timestamp; and
instructions for determining, by the idle thread, a length of time the particular one of the plurality of processors has been idle;
instructions for determining, by the idle thread, whether the particular one of the plurality of processors is no longer idle;
in response to the idle thread determining that the particular one of the plurality of processors is no longer idle:
instructions for setting, by the idle thread, a second timestamp;
instructions for determining, by the idle thread, an idle interval by determining a difference between the first timestamp and the second timestamp, wherein the time between the particular one of the plurality of processors becoming idle and the particular one of the plurality of processors no longer being idle is the idle interval;
instructions for incrementing, by the idle thread, a number of intervals, wherein the number of intervals is a total number of times that each one of the plurality of processors became idle and said each one of the plurality of processors was thereafter no longer idle;
instructions for adding, by the idle thread, the idle interval to an idle accumulator, wherein the idle accumulator is a total amount of time that all of the plurality of processors have spent idling during all of the intervals;
instructions for computing, by the idle thread, an average time spent idling by dividing the idle accumulator by the number of intervals; and
instructions for setting, by the idle thread, an idle threshold equal to the average time spent idling;
instructions for dynamically adjusting, by the idle thread, the idle threshold during runtime without user intervention by autonomically adjusting the idle threshold to a new value that is computed using an adjusted idle interval, an adjusted number of intervals, and an adjusted average time spent idling; and
in response to the length of time exceeding the idle threshold, instructions for making the particular processor available to perform other work.

8. The product according to claim 7, further comprising:
instructions for temporarily suspending said execution of said idle thread while said particular processor executes work;

instructions for pausing said accumulation, by said idle thread, of said length of time said particular processor has been idle when said idle thread execution is suspended;
instructions for resuming said execution of said idle thread;
instructions for resuming said accumulation, by said idle thread, of said length of time said particular processor has been idle when said idle thread execution is resumed.

9. The product according to claim 8, further comprising:
instructions for exiting said idle thread;
instructions for determining a start of an interval when said particular processor first becomes idle; and
instructions for determining an end of said interval when said idle thread is exited.

* * * * *